(12) United States Patent
Parikka et al.

(10) Patent No.: US 7,149,385 B2
(45) Date of Patent: Dec. 12, 2006

(54) OPTICAL COUPLING ARRANGEMENT

(75) Inventors: Marko Parikka, Salo (FI); Jari Turunen, Onttola (FI)

(73) Assignee: Nokia Corporation, Espoo (FI)

( * ) Notice: Subject to any disclaimer, the term of this patent is extended or adjusted under 35 U.S.C. 154(b) by 184 days.

(21) Appl. No.: 10/474,736

(22) PCT Filed: Apr. 11, 2002

(86) PCT No.: PCT/FI02/00304

§ 371 (c)(1),
(2), (4) Date: Oct. 14, 2003

(87) PCT Pub. No.: WO02/084348

PCT Pub. Date: Oct. 24, 2002

(65) Prior Publication Data

US 2004/0109642 A1    Jun. 10, 2004

(30) Foreign Application Priority Data

Apr. 12, 2001  (FI) .................................. 20010778

(51) Int. Cl.
*G02B 6/34*  (2006.01)
(52) U.S. Cl. ............................. 385/37; 385/13; 385/14
(58) Field of Classification Search .................. 385/12, 385/37
See application file for complete search history.

(56) References Cited

U.S. PATENT DOCUMENTS 4,512,848 A    4/1985    Deckman et al.
5,020,879 A *  6/1991    Kuzuta et al. ............... 359/573
5,367,588 A    11/1994   Hill et al.
5,526,454 A    6/1996    Mayer
5,799,117 A *  8/1998    Kragl et al. .................. 385/14

FOREIGN PATENT DOCUMENTS

WO    WO 99/52002    10/1999

OTHER PUBLICATIONS

Patent Abstracts of Japan, 8-238631, Sep. 17, 1996.
Patent Abstracts of Japan, vol. 2000, No. 7, Sep. 29, 2000, 2000-114581.
"Three-Dimensionally Interconnected Multi-Bus-Line Bi-directional Optical Backplane", Kim et al, Society of Photo-Optical Instrumentation Engineers, Opt. Eng., 38(9), pp. 1560-1566, 1999.

* cited by examiner

*Primary Examiner*—Frank G. Font
*Assistant Examiner*—Eric Wong
(74) *Attorney, Agent, or Firm*—Squire, Sanders & Dempsey, LLP.

(57) ABSTRACT

The invention relates to a method and an apparatus for manufacturing an optical coupling arrangement, and a specific coupling arrangement. A substrate waveguide (306) and at least one coupling element (304, 306) in the coupling arrangement are made of polymer material in the same replication process at the same time. At least one diffractive coupling element (304, 306) is then formed in the polymer material by placing the polymer material against a replication mould, which comprises a surface profile model of at least one diffractive coupling element (304, 306) that is patterned into the replication mould by means of micro lithography.

13 Claims, 4 Drawing Sheets

OPTICAL COUPLING ARRANGEMENT

FIELD OF THE INVENTION

The invention relates to an optical coupling arrangement based on a waveguide and on the use of a diffractive coupling element for coupling optical radiation to or from the waveguide.

BACKGROUND OF THE INVENTION

Optics plays an important part in for instance lighting technology, medicine, industrial measuring and monitoring applications and in telecommunications technology. A conventional optical system comprises macroscopic components placed widely apart from one another, and the size of a particularly complicated optical system may fill even a cubic meter space. In integrated optics, the aim is to combine optoelectro-mechanical structures in order to reduce the size using waveguide optics, packed optics or plane integrated optics.

Integrated microtechnology often employs diffractive optics, the components thereof comprising microstructures for manipulating optical radiation as desired. A diffractive component is used for example as a lens, a beam divider, an intensity distribution modifier, a mirror, an optical safety marking, a filter, an anti-reflecting surface or a polarization modifier.

A diffractive component is used as an element in an optical coupling arrangement based on substrate waveguide and comprising a glass substrate. Diffractive elements, the optical function of which is based on changes of the refractive index within the polymer, can interferometrically be made on the surface of the substrate using holographic exposure. Another alternative is to etch and metal coat the surface of a glass substrate (or quartz substrate), in which case the optical function of the diffractive components is based on the changes made to the interface profile between glass and metal. Such elements can be used to couple optical radiation between the waveguide and the environment. Such optical coupling arrangements based on substrate waveguide are particularly suitable as a backplane of an apparatus case in telecommunications technology, as in this way the electric data transmission can be reduced within a circuit board and between circuit boards. Such a solution is described in greater detail for example in publication G. Kim, R. T. Chen, Three-dimensionally interconnected multi-bus-line bi-directional optical back-plane, society of Photo-Optical Instrumentation Engineers, Opt. Eng., 38(9), pages 1560 to 1566 and 1999, incorporated herein by reference.

A problem with the optical coupling arrangement based on substrate waveguide is that it is poorly applicable to be utilized industrially, as in order to manufacture a diffractive element the substrate must be etched and metal coated or a holographic pattern must be prepared. Such a work can only be carried out in a laboratory by hand, which in turn results in the fact that the coupling arrangement becomes very expensive, is slow to manufacture and the quality is poor due to the tolerances associated with the aligning of the parts. An extensive production to fulfil the needs of telecommunication applications for example is therefore not possible, as mass production is required in industrial applications.

BRIEF DESCRIPTION OF THE INVENTION

It is an object of the invention to provide an improved manufacturing method, a coupling arrangement and an apparatus for manufacturing the coupling arrangement that allow simplifying the manufacture and enabling mass production without compromising the quality.

This is achieved with the method for manufacturing an optical coupling arrangement comprising a substrate waveguide and at least one coupling element for coupling optical radiation between the substrate waveguide and the environment. Furthermore, the method of the invention comprises the steps of making the substrate waveguide and at least one coupling element in the coupling arrangement of polymer material at the same time in the same replication process, in which forming at least one diffractive coupling element in the polymer material by placing the polymer material against a replication mould comprising a surface profile mould of at least one diffractive coupling element that is patterned into the replication mould by means of micro lithography.

The invention also relates to an optical coupling arrangement comprising a waveguide structure and at least one coupling element for coupling optical radiation between the waveguide structure and the environment. Furthermore, the substrate waveguide and at least one coupling element in the coupling arrangement are made of polymer material and manufactured at the same time in the same replication process, and at least one diffractive coupling element of the substrate waveguide is manaufactured by placing the polymer material against a replication mould comprising a surface profile model of at least one diffractive coupling element that is patterned into the replication mould by means of micro lithography.

The invention further relates to an apparatus for manufacturing an optical coupling arrangement, the optical coupling arrangement comprising a waveguide structure and at least one coupling element for coupling optical radiation between the waveguide structure and the environment. The apparatus comprises a replication mould for polymer material for manufacturing the waveguide structure and at least one coupling element associated with the waveguide structure at the same replication time; the replication mould comprises a surface profile model of at least one diffractive coupling element, the surface profile model of the coupling element is patterned into the replication mould by means of micro lithography, and the apparatus is arranged to form at least one diffractive coupling element in the polymer material of the waveguide structure by placing the polymer material of the waveguide structure against the replication mould and the surface profile model.

The preferred embodiments of the invention are disclosed in the dependent claims.

The invention is based on the idea that a substrate waveguide and at least one surface-patterned diffractive coupling element required therein, whose function is based on the penetration of optical radiation, are made of polymer material at the same time and in one replication process. A diffractive coupling element couples optical radiation to and from the waveguide as desired. The diffractive coupling element is formed in a replication stage using a mould comprising the diffractive pattern of the polymer material.

The method and system of the invention provide several advantages. The manufacture of the coupling arrangement comprising a waveguide structure and coupling elements for coupling optical radiation between the waveguide structure and the environment is simplified, and made more rapid and more economical. In addition, the solution makes mass production possible without having to deal with the problems concerning quality.

BRIEF DESCRIPTION OF THE DRAWINGS

In the following the invention is described in greater detail by means of the preferred embodiments with reference to the accompanying drawings, in which.

DETAILED DESCRIPTION OF THE INVENTION

Figure 1A:
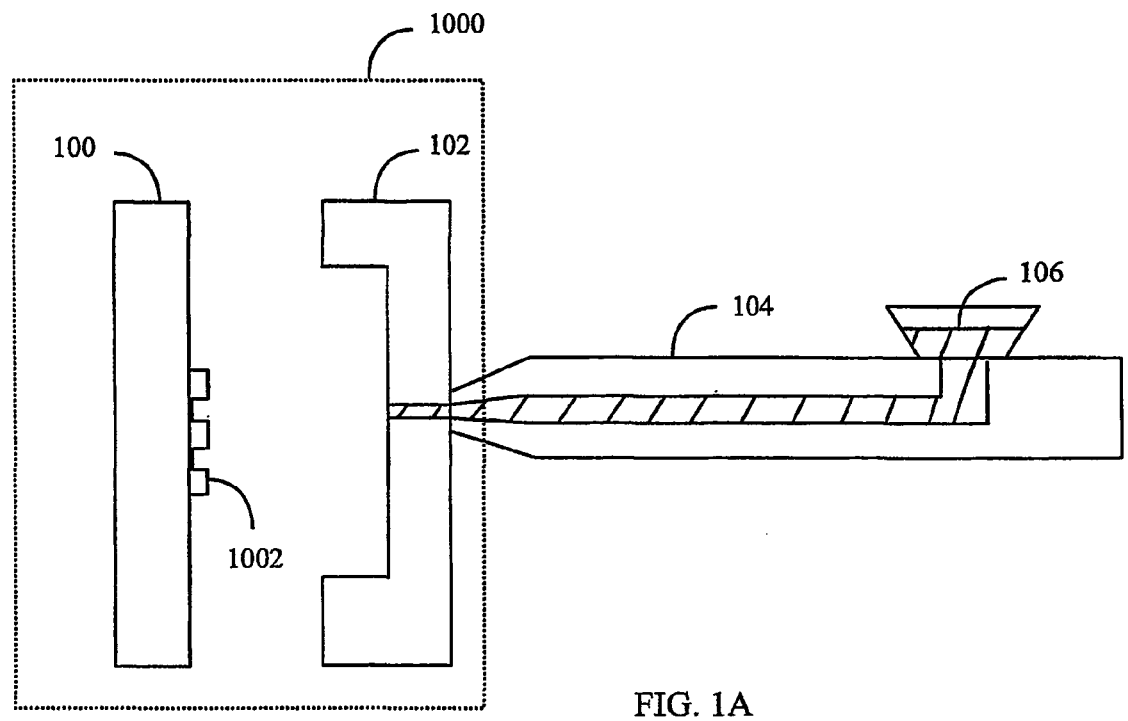
FIG. 1A shows an injection moulding process before moulding.
Figure 1B:
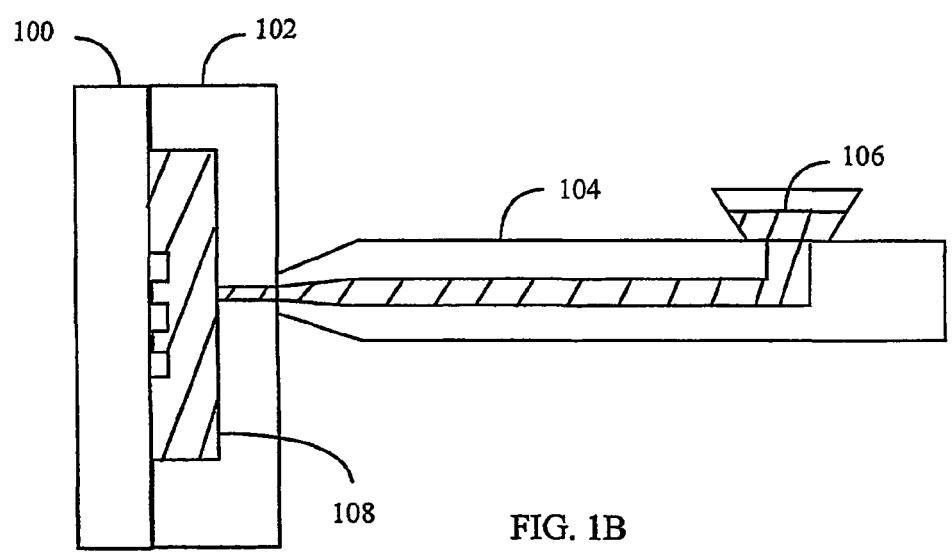
FIG. 1B shows the injection moulding process during moulding.
Figure 1C:
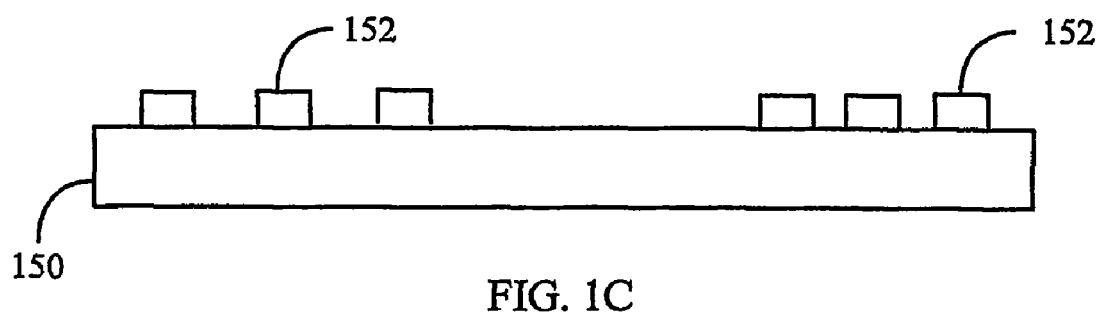
FIG. 1C shows a patterned polymer layer on a base.
Figure 1D:
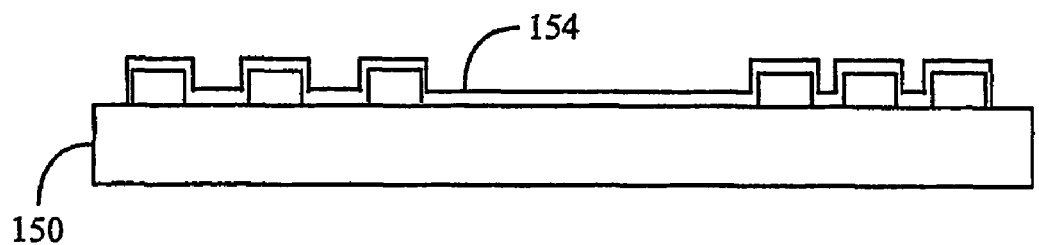
FIG. 1D shows a metal-clad polymer layer.
Figure 1E:
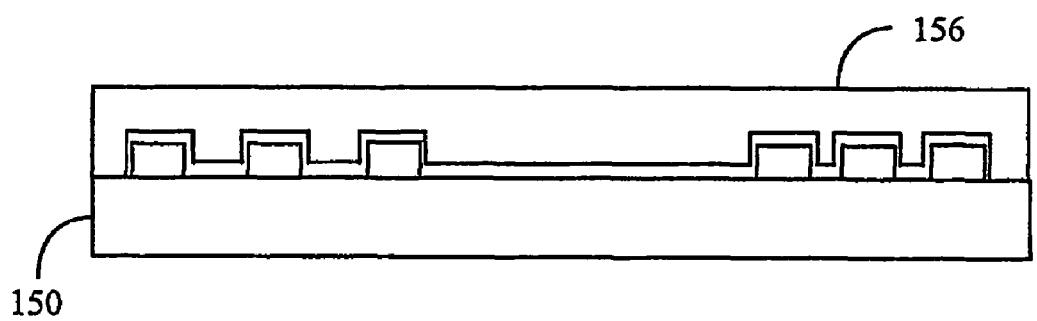
FIG. 1E shows a metal layer provided on a metal surface.
Figure 1F:
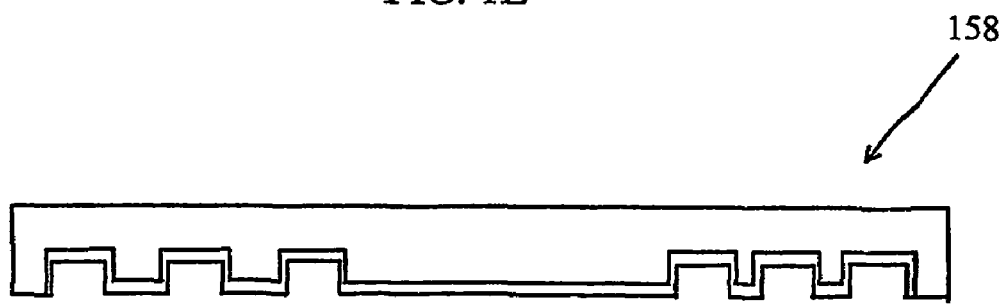
FIG. 1F shows a plate forming a diffractive pattern.

Several replication processes of polymer material exist, such as injection moulding and hot moulding, without being restricted thereto. FIGS. 1A and 1B show as an example the principle of an injection moulding method. An injection moulding arrangement according to FIG. 1A comprises a mould including a cover 100 and a bottom 102. In addition, the injection moulding arrangement comprises a feed clamp 104 with liquid polymer 106 (or plastic). The cover 100 is provided with a model 1002 for pressing or moulding microstructures, the model 1002 being commonly placed in a separately manufactured pattern plate, which is for instance a printing plate or another plate comprising a diffractive pattern. In FIG. 1B the cover 100 is fastened to the bottom 102 of the mould and liquid polymer mass is pressed or injected into the mould. A part 108 resembling the mould is formed in the mould, and a microstructure shaped according to the model 1002 is pressed onto the surface of the part 108. Molten plastic thus shapes in accordance with the structures of the model while being pressed against the model 1002.

In the solution shown, the part to be replicated is a substrate waveguide, on the surface of which at least one optical coupling element can be manufactured as a microstructure. The optical coupling element couples optical radiation between the substrate waveguide and the environment. In the replication process, a substrate waveguide in the coupling arrangement and at least one coupling element are made of polymer material at the same time in such a manner that as the substrate waveguide is being manufactured one or more diffractive coupling elements are formed in the polymer material by placing the polymer material against a replication mould for instance by pressing, moulding or compressing. The replication mould in turn comprises at least one diffractive coupling element model, which is patterned into the mould by means of micro lithography. The diffractive coupling element model is generally in the pattern plate, which is a part of the mould. Thus, the diffractive coupling element is specifically based on the surface structure forms (grooves and embosses) and on the fact that optical radiation penetrates the diffractive coupling element, and not on the refractive index differences or reflection of the material within the coupling element area.

Let us take a closer look how a pattern plate is manufactured in FIGS. 1C to 1F. The diffractive coupling element model is made into the mould by means of micro lithography that allows making microscopically modulated surface profiles. A typical process is the following. A thin polymer resist layer is spread onto a quartz or silicon wafer base or onto another corresponding base 150. The polymer resist layer is susceptible to electron radiation, ionic radiation or optical radiation meaning that the properties thereof change during irradiation so that the irradiated or unirradiated area can chemically be dissolved after irradiation.

A desired pattern can be formed onto the polymer resist layer using a focused electron beam, an ionic beam or an optical beam so that a desired pattern is formed while the beam moves in relation to the base. Thus, either the beam moves or the base moves. Alternatively, photon irradiation can be used through a mask including the desired pattern either so that the mask is in close contact with the polymer resist layer or that it is optically patterned onto the polymer resist layer. After this, the polymer resist layer is developed, or a chemical process is carried out for the polymer resist layer, where the resist is totally dissolved (grating type 1, FIG. 2A) or the resist is dissolved to the depth depending on the local amount of irradiation (grating type 2, FIG. 2B).

Thus, what is known as a master structure 152 is achieved that resembles the desired structure, but in soft polymer resist. This structure is next copied onto a metallic pattern plate to enable mass production. Then, the master structure formed from the resist is coated with a thin metal layer 154, and a surface conducting electricity is obtained. The coating can be carried out using evaporation or sputtering, and the thickness of the layer is normally a couple of dozen nanometers at the most. In order for the pattern plate to be firm, the thin metal layer is further electrolytically provided with metal 156 such as nickel. An actual pattern plate 158 is achieved by separating the pattern plate provided with metal from the master structure. The thickness of the pattern plate 158 provided with nickel is typically a couple of dozens of micrometers.

The pattern plate 158 is placed into a mould that is shaped as the desired part. When the mould is filled with plastic using a plastic upgrading technique, the pattern plate provided with nickel presses or forms otherwise wise the desired microstructures to the plastic substrate waveguide. The injection moulding technique is a good alternative, if mass production is desired, but diffractive coupling elements can be manufactured also using hot moulding technique or ultraviolet-hardening adhesives.

The surface-profiled grating structure in the optical coupling element is used to couple a desired amount of optical radiation from the optical power source to or from the waveguide, to a detector for instance. How much optical radiation is coupled to or from the waveguide depends on the diffraction efficiency of each grating that can be controlled for example using the groove breadth or groove depth of the surface profile in the coupling element.

Figure 2A:
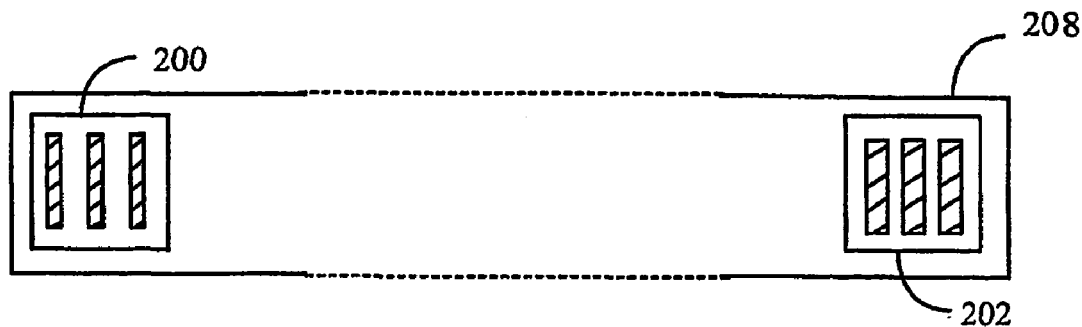
FIG. 2A shows how the diffraction efficiency of a grating is controlled by means of a filling factor.

In FIG. 2A, the changes of the filling factor affect the diffraction fraction efficiency (grating type 1). Thus, the depth of a binary grating is constant and changing the groove breadth of the grating controls the diffraction efficiency. In general, the aim is to achieve an even optical power from a substrate waveguide 208 to the detectors corresponding to the coupling elements (or an even power from the optical power sources to the waveguide). The filling factor is therefore lowest (below 0.5) for a first coupling element 200 and for a last coupling element 202 the filling factor is 0.5, referring to the fact that the breadth of the groove and the relief is equal.

Figure 2B:
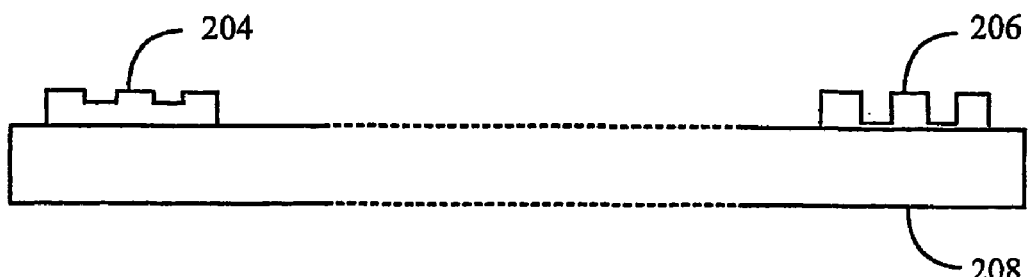
FIG. 2B shows how the diffraction efficiency of the grating is controlled by means of the groove depth.

FIG. 2B shows binary gratings 204 to 206, the filling factor of which is constant, for example 0.5, and the diffraction efficiency is controlled by changing the groove depth in the grating profile (grating type 2). Then, the depth of the grating profile is the smallest for the first coupling element 204 and increases when the diffraction efficiency is to be increased. The last coupling element 206 has the deepest grating groove. However, the solutions shown in FIGS. 2A and 2B are merely examples on how a desired even coupling efficiency or a desired distribution of coupling efficiencies is achieved.

Instead of or in addition to a binary surface profile, other surface face profile forms can also be used. For instance, a serrated pattern is possible. In fact, the grating in the coupling element can be implemented from any pattern.

Figure 3:
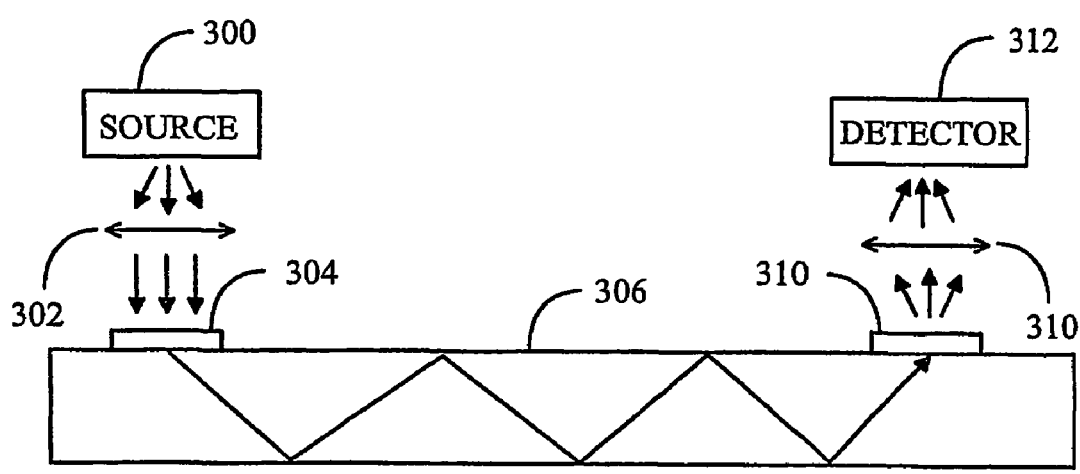
FIG. 3 shows the function of coupling elements and a waveguide.

FIG. 3 shows the basic function of the substrate waveguide and the coupling elements. An optical power source 300 radiates optical radiation that is assembled using a lens 302. The lens 302 is not necessary for the present solution. The optical power source 300 is for instance a LED diode (Light Emitting Diode) or a laser that sends signal in a pulse-like manner. Optical radiation in turn refers in this application to electromagnetic radiation that starts from ultraviolet radiation and continues to the infrared area as a wavelength band ranging from 40 nm to 1 mm. However, the optical power source or the function thereof is not relevant for the present solution. The lens 302 can be made of polymer material using a replication method in either the same or a different process at the same time or at different times as the substrate waveguide and the coupling element. The lens 302 can be placed close to a coupling element 304 almost in contact thereto, and the lens is separated from the coupling element 304 using nodules (not shown in FIG. 3), which are easy to manufacture for the substrate waveguide or for the lens in the replication stage. The lens can be a microlens such as a graded refractive index GRIN lens (GRaded INdex). The lens can also be binary, in which case the lens can be integrated to form a part of the binary grating structure of the coupling element 304 or the lens may be a separate component. In addition or alternatively the lens can also be placed between the coupling element 304 and a substrate waveguide 306.

The lens 302 employs collimation or focusing to direct optical radiation to the coupling element 304, which transfers the optical radiation as efficiently as desired to a substrate waveguide 306 at such an angle that the optical radiation proceeds while being subjected to total reflection. Optical radiation can be conveyed from the substrate waveguide using a coupling element 308, whose optical radiation radiated into the environment is gathered using a lens 310. The lens 310 focuses the optical radiation to a detector 312, which is conventionally a semiconductor detector. However, the lens 310 is not essential for the present solution. Like the lens 302, the lens 310 can be made of polymer material using a replication method in either the same or a different process at the same time or at different times as the substrate waveguide and the coupling element. The lens 310 can be placed close to the coupling element 308 almost in contact thereto, and the lens is separated from the coupling element 308 using nodules (not shown in FIG. 3), which are easy to manufacture for the substrate waveguide or for the lens in the replication stage. The lens 310 can be a microlens such as a graded refractive index GRIN lens (GRaded INdex). The lens can also be binary, in which case the lens can be integrated to form a part of the binary grating structure of the coupling element 310 or the lens may be a separate component. The lens can also be made in a diffractive fashion or as a refracting surface profile for a uniform waveguide in the manufacturing stage in the same way as the coupling element.

Figure 4:
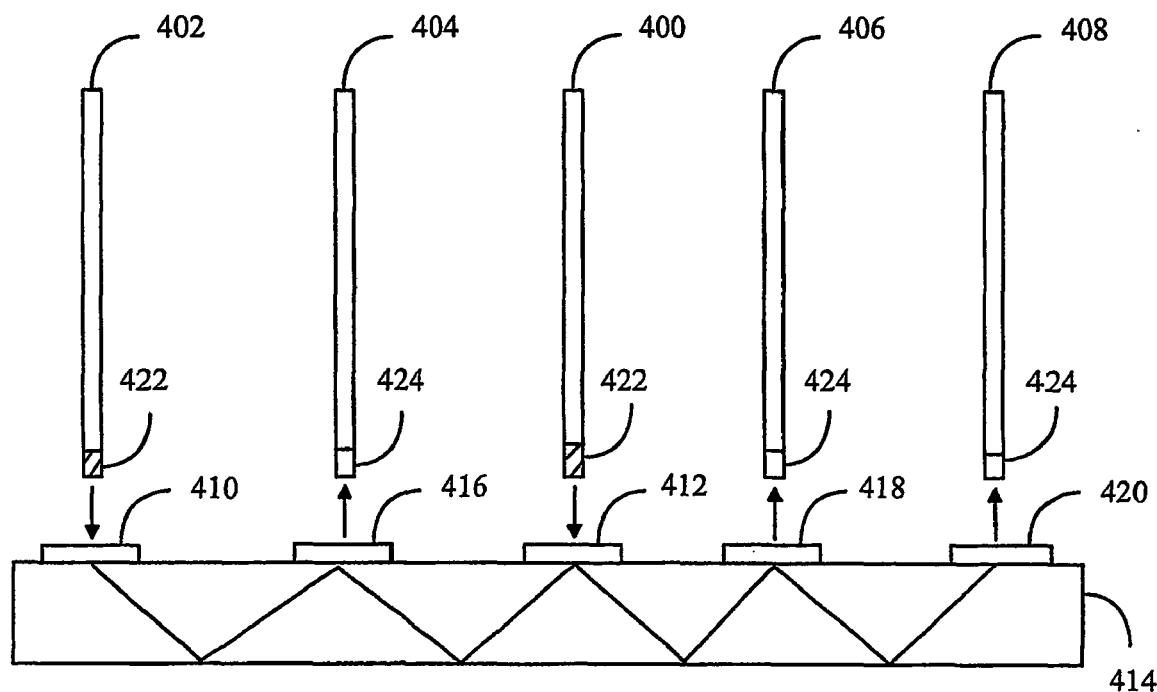
FIG. 4 shows how optical radiation is coupled between several circuit boards.

FIG. 4 shows an optical backplane that allows transferring optical signal between several circuit boards. In this example, optical signal is sent from two circuit boards 400 and 402, and optical signal is received from three circuit boards 404 to 408. The optical signal is coupled to a substrate waveguide 414 using coupling elements 410 and 412 and the optical signal is connected to the detectors of the circuit boards 404 to 408 using coupling elements 416 to 420.

Figure 5:
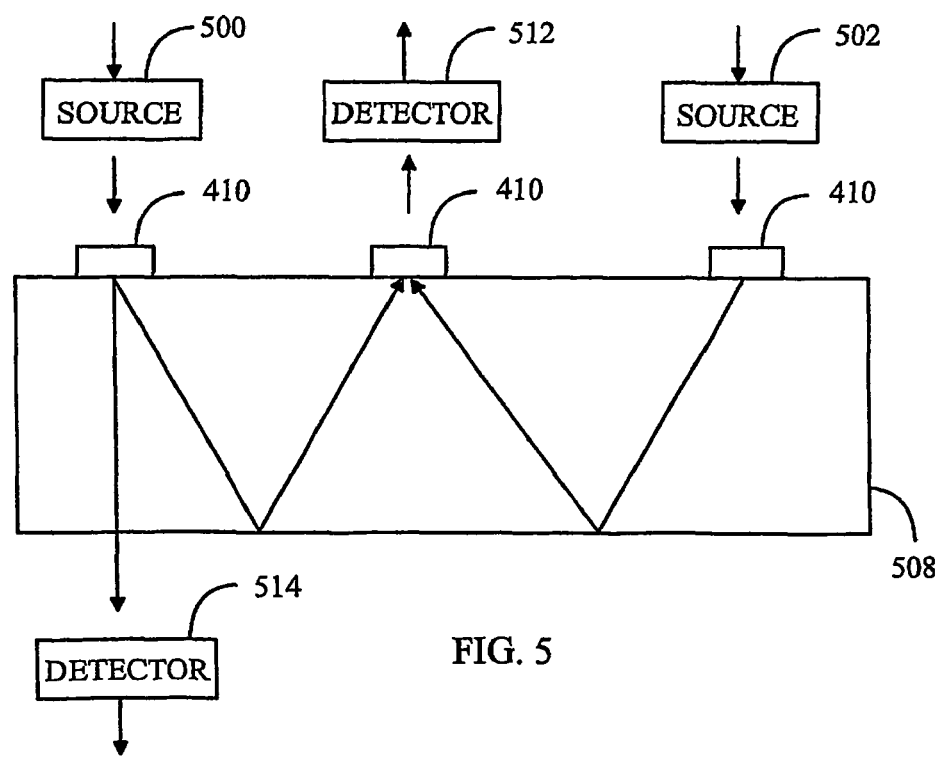
FIG. 5 shows a multi-channel and multi-dimensional coupling arrangement.

FIG. 5 shows a multi-channel and two-dimensional coupling arrangement. Optical power sources 500 and 502 send optical radiation towards coupling elements 504 and 506, which couple optical radiation to a substrate waveguide 508 in such a manner that some of the optical radiation is directed obliquely towards the back surface of the substrate waveguide. Optical radiation directed in such a manner advances in the waveguide while being subjected to total reflection. The optical radiation advances to a coupling element 510, which couples the optical radiation to a detector 512. Some of the optical radiation in turn falls vertically against both surfaces of the substrate waveguide and hits a detector 514. The radiation obliquely coupled to the substrate waveguide and the vertically penetrating radiation form two different channels in different dimensions. Likewise, the optical radiation sent by the second optical power source 502 is coupled through a coupling element 506 to the substrate waveguide 508, where the optical radiation proceeds through the coupling element 510 to the detector 512. The optical radiation of different optical power sources proceeding to the detector 512 is transferred in the same dimension but along a different channel. The channels can be separated from one another in the detection, for instance using modulation. The optical power sources 500 and 502 may be a Vertical Cavity Surface Emitting Laser VCSEL source without being restricted thereto.

Even though the invention has above been explained with reference to the example in the accompanying drawings, it is obvious that the invention is not restricted thereto but can be modified in various ways within the scope of the inventive idea disclosed in the attached claims.

The invention claimed is:

1. A method for manufacturing an optical coupling arrangement comprising a substrate waveguide and at least one coupling element for coupling optical radiation between the substrate waveguide and the environment, the method comprising:

making both the substrate waveguide and at least one diffractive coupling element of polymer material at a same time in one replication process, the process comprising forming both the substrate waveguide and at least one diffractive coupling element of the polymer material by placing the polymer material against a replication mould comprising a surface profile model of at least one diffractive coupling element that is patterned into the replication mould by means of micro lithography.

2. A method as claimed in claim 1, further comprising patterning the surface profile model of the diffractive coupling element into a pattern plate in the replication mould by means of micro lithography in such a manner that a resist spread upon a base provided for the surface profile model is patterned using radiation to conform to the diffractive coupling element and the pattern plate including the pattern of the diffractive coupling element is formed on the base using electrolysis.

3. A method as claimed in claim 1, further comprising patterning the model of the diffractive coupling element into a pattern plate in the replication mould by means of micro lithography in such a manner that the resist spread upon the base provided for the surface profile model is patterned using electron radiation, ionic radiation or optical radiation to conform to the diffractive coupling element and the pattern plate including the pattern of the diffractive coupling element is formed on the base using nickel electrolysis.

4. A method as claimed in claim 1, further comprising forming several optical channels into the waveguide substrate in more than one dimension and forming at least one diffractive coupling element for each channel.

5. An optical coupling arrangement comprising a substrate waveguide and at least one coupling element for coupling optical radiation between the substrate waveguide and the environment, wherein the substrate waveguide and at least one coupling element in the coupling arrangement are made of polymer material and manufactured at the same time in the same replication process, and both the substrate waveguide and at least one diffractive coupling element of the substrate waveguide are simultaneously manufactured by placing the polymer material against a replication mould comprising a surface profile model of at least one diffractive coupling element that is patterned into the replication mould by means of micro lithography.

6. A coupling arrangement as claimed in claim 5, wherein the replication mould comprises a pattern plate on which a surface profile model of the diffractive coupling element is patterned by means of micro lithography in such a manner that a resist spread upon a base provided for the surface profile model is patterned using radiation to conform to the diffractive coupling element and the pattern plate including the pattern of the diffractive coupling element is formed on the base using electrolysis.

7. A coupling arrangement as claimed in claim 5, wherein the replication mould comprises a pattern plate on which a surface profile mode in the diffractive coupling element is patterned by means of micro lithography in such a manner that the resist spread upon the base provided for the surface profile model is patterned using electron radiation, ionic radiation or optical radiation to conform to the diffractive coupling element and the pattern plate including the pattern of the diffractive coupling element is formed on the base using nickel electrolysis.

8. A coupling arrangement as claimed in claim 5, wherein the waveguide substrate comprises optical channels in more than one dimension and each channel is provided with at least one diffractive coupling element.

9. An apparatus for manufacturing an optical coupling arrangement, the coupling arrangement comprising a substrate waveguide and at least one coupling element for coupling optical radiation between the waveguide structure and the environment, wherein the apparatus comprises a replication mould, the replication mould is for polymer material,
the replication mould is for manufacturing the substrate waveguide at least one diffractive coupling element associated with the substrate waveguide at the same replication time,
the replication mould comprises a surface profile model of at least one diffractive coupling element,
the surface profile model of the diffractive coupling element is patterned into the replication mould by means of micro lithography, and
the apparatus is arranged to form both the substrate and at least one diffractive coupling element in the polymer material in the substrate waveguide by placing the polymer material of the substrate waveguide against the replication mould and the surface profile model.

10. An apparatus as claimed in claim 9, wherein the replication mould comprises a pattern plate patterned as the surface profile model into the replication mould by means of micro lithography, the pattern plate being manufactured in such a manner that a resist spread upon a base provided for the surface profile model is patterned using radiation to conform to the diffractive coupling element, and the pattern plate including the pattern of the diffractive coupling element is formed of the base using electrolysis.

11. An apparatus as claimed in claim 9, wherein the replication mould comprises a pattern plate patterned as the surface profile model into the replication mould by means of micro lithography, the pattern plate being manufactured in such a manner that a resist spread upon a base provided for the surface profile model is patterned using electron radiation, ionic radiation or optical radiation to conform to the diffractive coupling element, and the pattern plate including the pattern of the diffractive coupling element is formed of the base using nickel electrolysis.

12. An apparatus as claimed in claim 9, wherein the replication mould comprises a pattern plate as the surface profile model, on which the surface profile model in the diffractive coupling element is patterned, and the apparatus is arranged to press the pattern plate of the replication mould against the polymer material in order to form the diffractive coupling element.

13. An apparatus as claimed in claim 9, wherein the apparatus is arranged to form several optical channels to the waveguide substrate in more than one dimension and the apparatus is arranged to form at least one diffractive coupling element for each optical channel.

* * * * *